C. W. TAYLOR.
DIFFERENTIAL MECHANISM.
APPLICATION FILED SEPT. 5, 1916.
1,270,897.
Patented July 2, 1918.
2 SHEETS—SHEET 1.
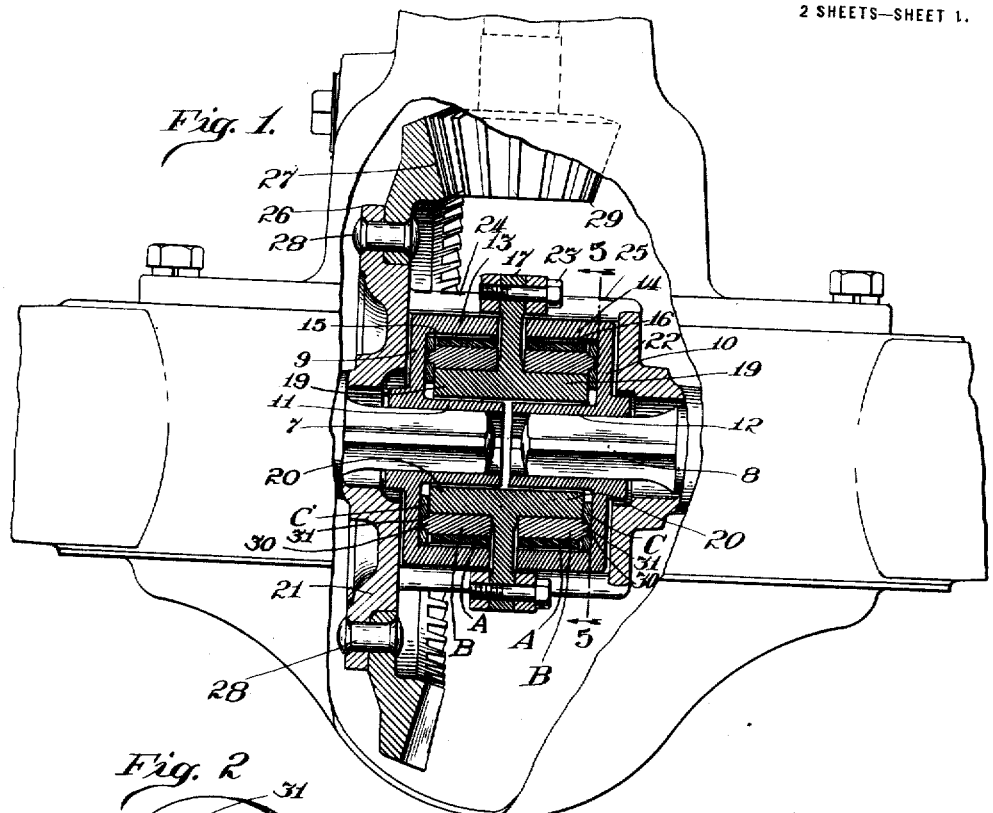
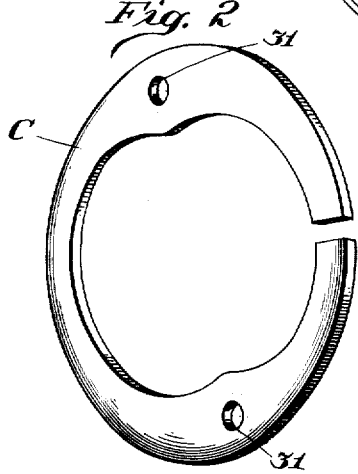
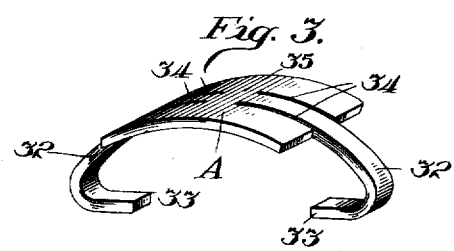
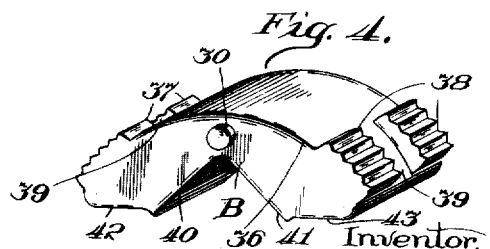
Witness
Milton Lenoir
Inventor
Clarence W Taylor C. W. TAYLOR.
DIFFERENTIAL MECHANISM.
APPLICATION FILED SEPT. 5, 1916.
1,270,897.
Patented July 2, 1918.
2 SHEETS—SHEET 2.
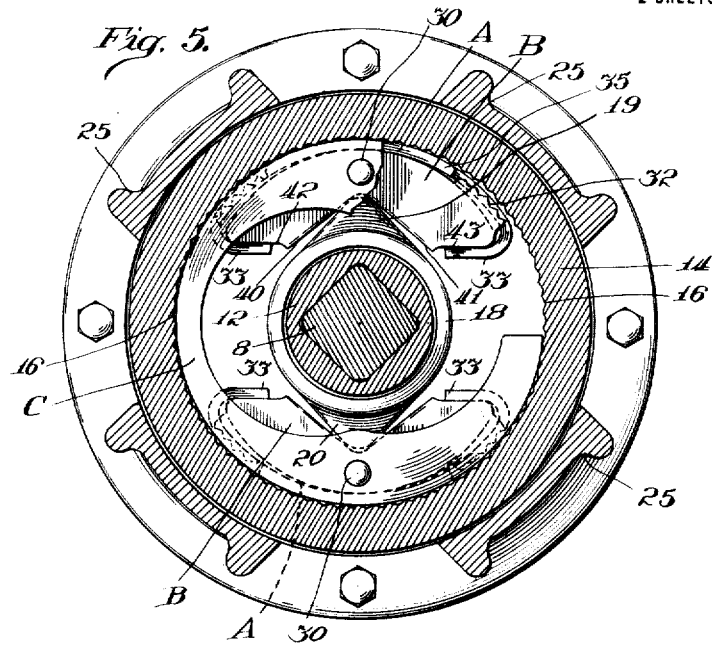
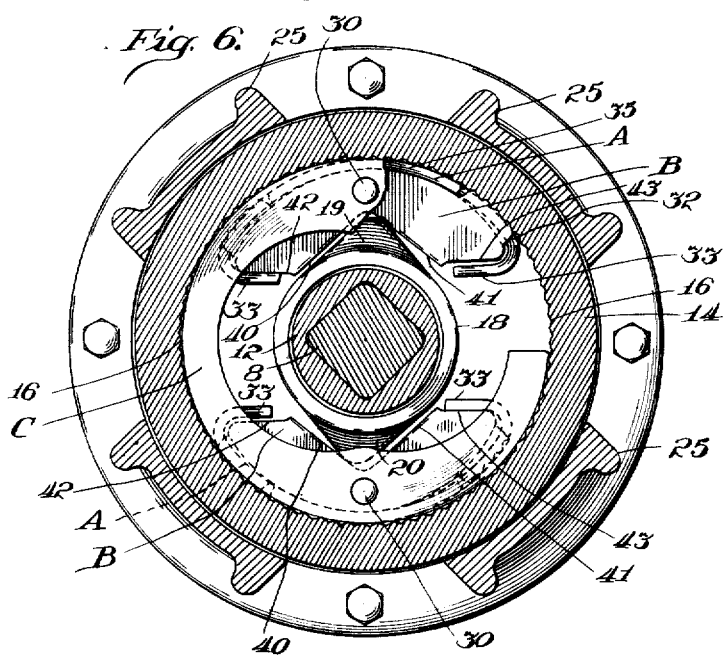
Witness
Milton Lenoir
Inventor
Clarence W Taylor

UNITED STATES PATENT OFFICE.

CLARENCE W. TAYLOR, OF CHICAGO, ILLINOIS, ASSIGNOR TO NATIONAL DIFFERENTIAL CO., OF CHICAGO, ILLINOIS, A CORPORATION OF ILLINOIS.

DIFFERENTIAL MECHANISM.

1,270,897.  Specification of Letters Patent.  Patented July 2, 1918.

Application filed September 5, 1916. Serial No. 118,334.

*To all whom it may concern:*

Be it known that I, CLARENCE W. TAYLOR, a citizen of the United States of America, residing at Chicago, in the county of Cook and State of Illinois, have invented certain new and useful Improvements in Differential Mechanism, of which the following is a specification.

My invention relates to differential mechanism particularly for automobiles, tractors and the like, and is an improvement in connection with the power transmission mechanism disclosed in my Patent #1062934 dated May 27th, 1913.

Besides having the same objects in view as disclosed in my prior application filed November 4, 1912, Serial #729208, which matured in said patent, the present invention aims to provide simple and effective means to oppose rotative movement of the coupling-units whenever power is applied thereto by the driving member for power transmission engagement of the coupling-units with the respective driven members.

With the foregoing and other objects in view, my present invention consists in the novel features and in the novel combinations and arrangement of parts hereinafter fully described, illustrated in the accompanying drawings, forming a part of this specification, and particularly pointed out in the claims hereunto appended; it being understood that changes, variations and modifications in the details of the invention within the scope of the claims may be resorted to without departing from the spirit or sacrificing any of the advantages thereof, hence I do not limit my invention to the exact construction and arrangement of parts shown and described.

Referring to the drawings, Figure 1 is a longitudinal section of a rear axle of an automobile at the meeting ends of a divided shaft. Fig. 2 is a perspective of a flat split ring. Fig. 3 is a perspective of the resilient element of a coupling-unit. Fig. 4 is a perspective of the clutch member of a coupling-unit. Fig. 5 is a cross section on line 5—5 on Fig. 1. Fig. 6 is a similar view with the coupling-units in power transmitting engagement with the driven member.

Similar letters and numerals refer to similar parts throughout the several views.

In the form of the invention shown, and which has been chosen for illustrative purposes, the invention not being limited to the exact construction, there is shown the meeting ends 7, 8, of a divided rear axle or shaft, the shaft ends having fixed thereto driven parts 9, 10, having inwardly extending hubs 11, 12, and clutch drum portions 13, 14, provided with internal annular series of clutch teeth 15, 16.

Positioned between the open ends of the drums 13, 14 is an annular web 17, which has formed integral therewith a hollow body portion 18, having lateral portions termed cam lugs 19, 20. The two halves 21, 22 of the rotatable housing are secured together by bolts 23, through the inner ends of arms 24, 25. The part 21 of the housing carries an annular flange 26, which carries the bevel gear wheel 27 which is fixed to the flange 26 by rivets 28. The gear 27 is in mesh with bevel pinion 29 on the engine shaft (not shown).

The letter A denotes what is termed the resilient element of a coupling-unit hereinafter fully described; the letter B designates what is termed the clutch member of the coupling-unit, and the letter C points out what is termed a split friction-ring. The pivot 30 on the member B, is positioned parallel with the axle or shafts, and, when assembled is seated in the aperture 31 in the member C.

The split ring C is made of somewhat greater cross section than the inside diameter of the clutch drums 13, 14, and, preferably is made of spring steel and its periphery constantly is in frictional engagement with the driven member.

The member C is particularly provided to oppose or interfere with the free rotation of the parts A and B with the driver.

The element A preferably is made of spring steel and partially formed and then flexed and mounted upon the part B, as indicated in Fig. 5, in which view it will be noted the split ring or friction element C is partly broken away.

The resilient element A is alike at both ends, having a neck portion 32 with under turned free end 33 and slits 34 in the body portion 35.

The rocking member B is segmental in form with an outer recess 36, and radial groups of clutch teeth 37, 38, with recess 39 between each group. On the inner surface of the clutch member B are formed cam surfaces 40, 41, against which the cam-lugs 19, 20 of the driving member operate. The clutch member B is cut away at 42, 43, to afford suitable bearing faces at the ends thereof for the free ends 33, of element A to grasp.

Preferably there is employed a pair of coupling-units for each driven member. The units consist of the members A and B properly assembled.

To provide against wear of the parts in operation resulting in a tendency of the coupling-units to travel along with the driving member prior to engagement with the driven member, I have provided what is termed a friction, retarding or drag element positioned between the clutch member B of the coupling-unit and the driven member.

It will be noted if any friction or drag between the driven member and the clutch-member B of the coupling-unit is in reality at any time needed it is only momentary and for the very brief period of time between initial imparting of power by the driving member against the inclined plane or cam surface and the travel of the end of the flexed resilient element A through the distance of a running fit between the element A and the driven member, when the element A becomes a drag or brake to prevent free rotative movement of the coupling-unit with respect to the driven member.

The degree of retardation effected by the drag element C is less than the force required to flex the resilient element A of the coupling-unit, hence it is not possible for the driven member of the vehicle wheel turning a corner to lock itself against the inner vehicle wheel, or accomplish what is called "running over."

The coupling-unit is operable in either direction only by the driving member which is carried by the rotatable housing.

In operation, it being assumed the parts are in normal position out of power transmission engagement and the vehicle wheels are at rest. When the driver is actuated in either direction, if in a forward direction, the lugs 19, 20, will be moved against the inclined planes 40, 41, and thus the clutch teeth 38 will be forced into engagement with the driven member, when both vehicle wheels will be positively driven and will so continue until one of the vehicle wheels, for example, in turning a corner, runs ahead of the driver, the coupling-unit will be carried ahead of the driver and be free from the force of the driver when the resilient element A will instantly restore the clutch member B to normal disengaged position. What is termed a separate friction element C is at all times in friction contact with the driven member and in pivot relation to the clutch-member B, but it never exerts as great force against the driven member as that required to flex the spring blade A which partly embraces the member B.

The member A is fulcrumed on the outer surface of the member B, with which it is formed and mounted to have relative movement.

Having thus described my invention, what I claim as new, and desire to secure by Letters Patent, is:

1. In mechanism of the class described, the combination with a driving member and a driven member, of a coupling-unit comprising a clutch-member and a resilient element, both operable by the driving member, and a friction element between the clutch-member and the driven member.

2. In mechanism of the class described, the combination of a driving member and a driven member, a coupling-unit having a rocking clutch-member and a resilient member having a movement relative to the clutch-member, and a separate friction element between the clutch-member and the driven member.

3. In mechanism of the class described, the combination of independent shafts and a clutch-drum fixed to one end of each shaft, a driving member, a resilient lever adjacent each clutch-drum, a clutch member for each lever adapted to be actuated by the driving member, and a separate friction element between each clutch-member and a clutch drum for drag effort therebetween.

4. In mechanism of the class described, the combination of a coupling-unit comprising a resilient element and a clutch-member having clutch teeth for engagement with a driven member the resilient element and the clutch-member being formed and mounted for relative movement, and a separate friction element between the clutch-member and the driven-member for drag effort therebetween.

5. In mechanism of the class described, the combination of a driving member and a driven member, a fulcrumed resilient member positioned to exert force against the driven member and a clutch member having groups of clutch teeth on its outer face and inclined-plane-surfaces on the other side and operable by the driving member, and a separate friction element between the clutch-member and the driven member for drag effort therebetween.

6. In mechanism of the class described, the combination of a driving member and a driven member, a resilient member formed or flexed to the arc of the driven member, and a rocking clutch-member held in normal position by the resilient member and formed on one side to be operated by the driving member, and a friction element pivoted to the clutch member.

7. In mechanism of the class described, the combination of a driving member carrying one or more cams and a driven member having an internal annular series of clutch teeth, a coupling-unit comprising a resilient member mounted for lever action against the driven member and a rocking clutch-member having a plurality of series of clutch teeth for engagement with the clutch teeth of the driven member and formed on the other side to be actuated by a cam on the driving member, and a separate friction element between the clutch member and the driven member for additional drag effort therebetween.

8. In mechanism of the class described, the combination of independent shafts and a clutch-drum fixed to one end of each shaft, a driving member, a resilient member formed or flexed to the arc of each clutch-drum, a rocking-clutch-member held in normal disengaged position by the respective resilient member and formed on one side to be operated by the driving member, the resilient members and the clutch-members having relative movement, and a separate friction member in each clutch-drum between the clutch-member and the clutch-drum.

9. In mechanism of the class described, the combination of independent shafts and a clutch-drum having an internal annular series of clutch teeth fixed to one end of each shaft, a driving member, a plurality of coupling-units within each clutch-drum, one member of each coupling-unit having a plurality of series of clutch teeth for engagement with the clutch teeth of the clutch-drum, and a separate friction element pivoted to one member of each of the coupling-units.

In testimony whereof I affix my signature in presence of a witness.

CLARENCE W. TAYLOR.

Witness:
SCOTT M. HOGAN.

It is hereby certified that the assignee in Letters Patent No. 1,270,897, granted July 2, 1918, upon the application of Clarence W. Taylor, of Chicago, Illinois, for an improvement in "Differential Mechanism," was erroneously described and specified as National Differential Company, whereas said assignee should have been described and specified as *Natural Differential Co.*, as shown by the records of assignments in this office; and that the said Letters Patent should be read with this correction therein that the same may conform to the record of the case in the Patent Office.

Signed and sealed this 24th day of December, A. D., 1918.

[SEAL.]

F. W. H. CLAY,
*Acting Commissioner of Patents.*

Cl. 74—7.